US012716508B2

(12) United States Patent
Wang et al.

(10) Patent No.: US 12,716,508 B2
(45) Date of Patent: Aug. 25, 2026

(54) FLUID CONTROL ASSEMBLY AND FABRICATION METHOD THEREFOR

(71) Applicant: ZHEJIANG SANHUA AUTOMOTIVE COMPONENTS CO., LTD., Hangzhou (CN)

(72) Inventors: Lixin Wang, Hangzhou (CN); Long Lin, Hangzhou (CN); Yun Wang, Hangzhou (CN); Jianhua Chi, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 193 days.

(21) Appl. No.: 18/552,915

(22) PCT Filed: Mar. 28, 2022

(86) PCT No.: PCT/CN2022/083239

§ 371 (c)(1),
(2) Date: Sep. 28, 2023

(87) PCT Pub. No.: WO2022/206647

PCT Pub. Date: Oct. 6, 2022

(65) Prior Publication Data

US 2024/0159321 A1 May 16, 2024

(30) Foreign Application Priority Data

Mar. 31, 2021 (CN) ......................... 202110345642.5

(51) Int. Cl.
*F16K 11/085* (2006.01)
*F16J 15/06* (2006.01)
(Continued)

(52) U.S. Cl.
CPC ......... *F16K 11/0856* (2013.01); *F16J 15/062* (2013.01); *F16J 15/102* (2013.01);
(Continued)

(58) Field of Classification Search
CPC .. F16K 11/0856; F16K 27/065; F16K 11/085; F16J 15/062; F16J 15/102; F16J 15/106; F16J 15/108; F16J 15/14
See application file for complete search history.

(56) References Cited

U.S. PATENT DOCUMENTS 3,116,198 A * 12/1963 Grawey .................... C08L 9/02 428/339
3,166,332 A * 1/1965 Olson .................... F16J 15/106 264/46.7

(Continued)

FOREIGN PATENT DOCUMENTS

CN 102754286 A 10/2012
CN 103291952 A 9/2013

(Continued)

OTHER PUBLICATIONS

International Search Report for PCT/CN2022/083239 mailed Jul. 1, 2022, ISA/CN.

(Continued)

*Primary Examiner* — Craig M Schneider
*Assistant Examiner* — Christopher D Ballman
(74) *Attorney, Agent, or Firm* — Yue (Robert) Xu; Apex Attorneys at Law, LLP

(57) ABSTRACT

A fluid control assembly and a fabrication method therefor. The fluid control assembly comprises a housing and a sealing member. The housing comprises a first mounting main body having a mounting surface, and the housing is provided with at least two passages and an accommodating groove which surrounds the passages. The accommodating
(Continued)

groove extends from the mounting surface to the interior of the first mounting main body. The sealing member has the same number of first through holes as that of the passages, and the first through holes correspond to and communicate with the passages of the housing. The sealing member comprises a main body part and a first outer extension part which are connected to one another. Along the height direction of the main body part, the first outer extension part protrudes from the main body part.

18 Claims, 7 Drawing Sheets

(51) Int. Cl.
*F16J 15/10* (2006.01)
*F16J 15/14* (2006.01)
*F16K 27/06* (2006.01)

(52) U.S. Cl.
CPC ........... *F16J 15/106* (2013.01); *F16J 15/108* (2013.01); *F16J 15/14* (2013.01); *F16K 11/085* (2013.01); *F16K 27/065* (2013.01)

(56) References Cited

U.S. PATENT DOCUMENTS

| | | | | |
|---|---|---|---|---|
| 4,371,178 A * | 2/1983 | Ott | F16K 11/0712 277/944 |
| 5,145,410 A * | 9/1992 | Maejima | H01R 13/5208 439/587 |
| 5,341,841 A * | 8/1994 | Schaefer | F15B 13/081 137/561 A |
| 5,632,653 A * | 5/1997 | Sawada | H01R 13/5208 439/587 |
| 6,071,147 A * | 6/2000 | Tsukamoto | H01R 13/5208 439/275 |
| 6,872,092 B2 * | 3/2005 | Oka | H01R 13/5208 439/275 |
| 6,913,486 B2 * | 7/2005 | Nagayasu | H01R 13/5208 439/587 |
| 7,033,216 B2 * | 4/2006 | Ito | H01R 13/5208 439/275 |
| 7,156,698 B2 * | 1/2007 | Yamashita | H01R 13/5208 439/587 |
| 7,273,395 B2 * | 9/2007 | Hayashi | H01R 13/506 439/587 |
| 8,568,168 B2 * | 10/2013 | Han | H01R 13/5208 439/587 |
| 8,579,299 B2 * | 11/2013 | Zhuang | F16J 15/108 277/637 |
| 8,771,014 B2 * | 7/2014 | Nakamura | H01R 13/5208 439/587 |
| 10,337,534 B2 * | 7/2019 | Kuhlen | F16J 15/104 |
| 10,587,071 B2 * | 3/2020 | Masui | H01R 13/64 |
| 10,883,619 B2 * | 1/2021 | Smith | F16K 27/065 |
| 11,378,191 B2 * | 7/2022 | Wang | F16K 11/085 |
| 2005/0077683 A1 * | 4/2005 | Comert | B60R 13/06 277/300 |
| 2005/0269788 A1 * | 12/2005 | Grunfeld | F16J 15/127 277/592 |
| 2008/0315456 A1 | 12/2008 | Ljungbeck et al. | |
| 2012/0302094 A1 | 11/2012 | Nakamura et al. | |
| 2013/0220445 A1 | 8/2013 | Bakhshi et al. | |
| 2013/0277916 A1 * | 10/2013 | Sakate | F16J 15/102 277/345 |
| 2018/0361638 A1 * | 12/2018 | Yang | B29C 45/76 |
| 2019/0285179 A1 * | 9/2019 | Abe | F16J 15/102 |
| 2020/0256472 A1 | 8/2020 | Henker | |
| 2020/0300516 A1 | 9/2020 | Wang et al. | |
| 2021/0033193 A1 * | 2/2021 | Aoki | F16J 15/062 |

FOREIGN PATENT DOCUMENTS

| | | | |
|---|---|---|---|
| CN | 110529628 | A | 12/2019 |
| CN | 111434957 | A | 7/2020 |
| CN | 112081978 | A | 12/2020 |
| EP | 1922201 | A1 | 5/2008 |
| JP | 05077685 | U | 10/1993 |
| JP | H11-248020 | A | 9/1999 |
| JP | 2000227167 | A | 8/2000 |
| JP | 2001-200934 | A | 7/2001 |
| JP | 2002-520554 | A | 7/2002 |
| JP | 2009085290 | A | 4/2009 |
| JP | 2011-231908 | A | 11/2011 |
| JP | 2014-107340 | A | 6/2014 |
| JP | 2019-100362 | A | 6/2019 |
| WO | 2013176108 | A1 | 11/2013 |
| WO | 2016/208186 | A1 | 12/2016 |
| WO | 2020/217665 | A1 | 10/2020 |

OTHER PUBLICATIONS

First Office Action dated Apr. 2, 2024 for Japanese patent application No. 2023-559780, English translation provided by Global Dossier.

The Japanese second Office Action issued on Sep. 24, 2024 for the Japanese counterpart application No. 2023-559780.

European Search Report issued on Feb. 12, 2025 for the European counterpart application No. 22778829.6.

* cited by examiner

Q1

Y
H
233
25
232
24
23
231
m
111
13
h
a
22
11
W

FLUID CONTROL ASSEMBLY AND FABRICATION METHOD THEREFOR

This disclosure is a national phase application of PCT international patent application PCT/CN2022/083239, filed on Mar. 28, 2022 which claims the priority to Chinese Patent Disclosure No. 202110345642.5, titled "FLUID CONTROL ASSEMBLY AND MANUFACTURE METHOD THEREFOR", filed with the China National Intellectual Property Administration on Mar. 31, 2021, the entire disclosure of which are incorporated herein by reference.

FIELD

This disclosure relates to the technical field of fluid control, in particular to a fluid control assembly and a manufacture method of the fluid control assembly.

BACKGROUND

In the flow path connection of a fluid control system, a sealing member is usually arranged between two mounting surfaces to prevent fluid from leaking between the two mounting surfaces, so the arrangement of the sealing member has an influence on the sealing performance of the fluid control system.

SUMMARY

The embodiment according to the disclosure provides a fluid control assembly and a manufacture method thereof, which can improve the sealing performance of the fluid control assembly.

On one hand, an embodiment of the present disclosure provides a fluid control assembly, which includes a housing and a sealing member. The housing includes a first mounting main body with a mounting surface, and the housing is provided with at least two passages and an accommodating groove which surrounds the passages. The passages penetrate through the mounting surface, and the accommodating groove extends from the mounting surface toward the interior of the first mounting main body.

The sealing member has a first through hole, the first through hole corresponds to and are in communication with the passage of the housing. The sealing member includes a main body and a first outer extension part which are connected to each other. Along the height direction of the main body, the first outer extension part protrudes from the main body, and the first outer extension part forms a closed-loop protruding structure around the first through hole at one end of the first through hole.

At least a part of the main body is filled within the accommodating groove, at least a part of the first outer extension part is located on the outer side of the accommodating groove and protrudes from the mounting surface. The sealing member and the housing are an integral structure.

On the other hand, the embodiment of the disclosure also provides a manufacture method of a fluid control assembly, the manufacture method includes the following steps.

Forming a housing, wherein the formed housing includes a first mounting main body with a mounting surface. The housing is provided with at least two passages and an accommodating groove which surrounds the passages, and the accommodating groove extends from the mounting surface toward the interior of the first mounting main body.

Placing the formed housing at a forming position of a sealing member.

Forming the sealing member at the forming position of the sealing member, which includes filling a part of the sealing member material into the accommodating groove to form at least a part of the main body, and protruding another part of the sealing member material from the main body beyond the mounting surface to form a first outer extension part. The formed sealing member and the housing are fixedly connected into an integral structure and sealing member surrounds the passage.

On the other hand, an embodiment of the present disclosure also provides a manufacture method of a fluid control assembly, the manufacture method includes the followings.

By means of a dual-color injection molding process, the housing and the sealing member are injection molded, and the sealing member and the housing are fixedly connected into an integral structure.

The formed housing includes a first mounting main body with a mounting surface. The housing has at least two passages and an accommodating groove which surrounds the passages, and the accommodating groove extends from the mounting surface to the interior of the first mounting main body. A portion of the formed sealing member is located in the accommodating groove to form at least a portion of the main body, and a portion of the sealing member protrudes from the main body beyond the mounting surface to form a first outer extension part.

According to the fluid control assembly and the manufacture method of the fluid control assembly provided by the embodiment of the disclosure, the fluid control assembly includes a housing and a sealing member. The housing includes at least two passages, the sealing member includes first through holes that correspond to and are in communication with the passages, so that fluid can circulate in the passages and the first through hole. The sealing member includes a main body and a first outer extension part protruding from the main body, and the first outer extension part forms a closed-loop protruding structure around the first through hole at one end of the first through hole. At least a part of the first outer extension part protrudes from the mounting surface, and other components can compress the first outer extension part to deform the sealing member, thereby achieving the sealing between the fluid control assembly and other components. Because the sealing member and the housing are fixedly connected into an integral structure, it is possible to avoid the risk that the sealing member is missed or the sealing member falls off during the transportation and transshipment of the fluid control assembly. Compared with assembling the sealing member separately from the housing, according to the embodiment of the present disclosure, by forming the sealing element and the housing into an integral structure, it is possible to reduce the number of parts, simplify the assembly procedure of the fluid control assembly, and prevent the risk of sealing failure caused by the sealing member falling off or dislocation.

DETAILED DESCRIPTION OF THE EMBODIMENTS

The features and exemplary embodiments of various aspects of the present disclosure are described in detail below. To make the objects, technical solutions and advantages of the present disclosure more clear and apparent, the present disclosure is described in detail in conjunction with the drawings and specific embodiments. Herein, relational terms such as "first" and "second" etc. are only used to distinguish one component from another having the same name and do not necessarily require or imply that any such actual relationship or order exists between those components.

In a fluid control system, it includes a plurality of structural members which are interconnected and sealed, and a fluid can be in communication among the structural members. For example, the structural members can be interconnected and sealed control valves and flow passage plates, and the fluid can be in communication between the control valves and flow passage plates. In order to prevent fluid from leaking at the joint surfaces of the two structural members, a sealing member is usually provided between the two interconnected structural members to realize the sealing between the two.

Figure 1:
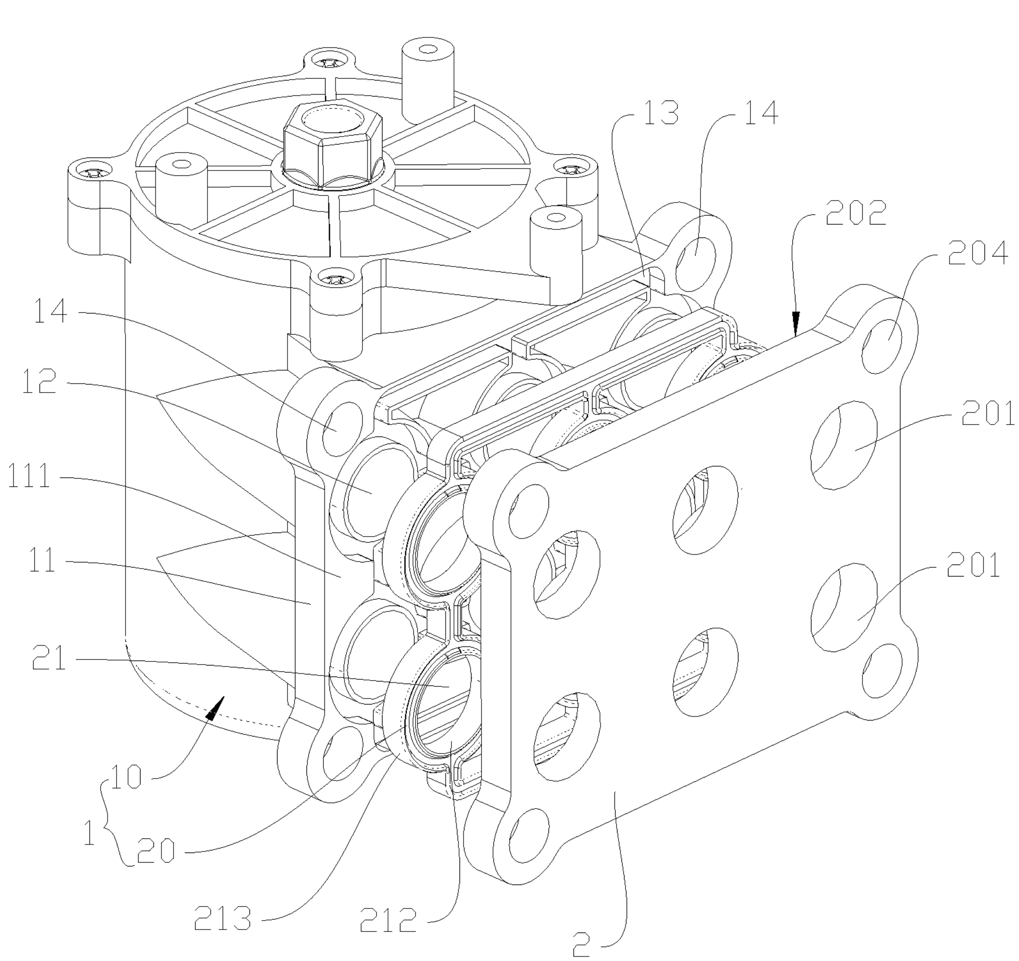
FIG. 1 is a schematic view of an exploded structure of an embodiment of a fluid control assembly provided according to one embodiment of the present disclosure.

As shown in FIG. 1, a fluid control assembly 1000 is provided in an embodiment of the present disclosure, including a body 1 and a connecting portion 2 which are connected to each other and provided in a sealed manner, and a fluid can be in communication between the body 1 and the connecting portion 2. The body 1 may include a first mounting hole 14, and the connecting portion 2 may include a second mounting hole 204 corresponding to the first mounting hole 14. The body 1 and the connecting portion 2 are fixedly connected by aligning the first mounting hole 14 and the second mounting hole 204 and by means of a fastener.

Figure 2:
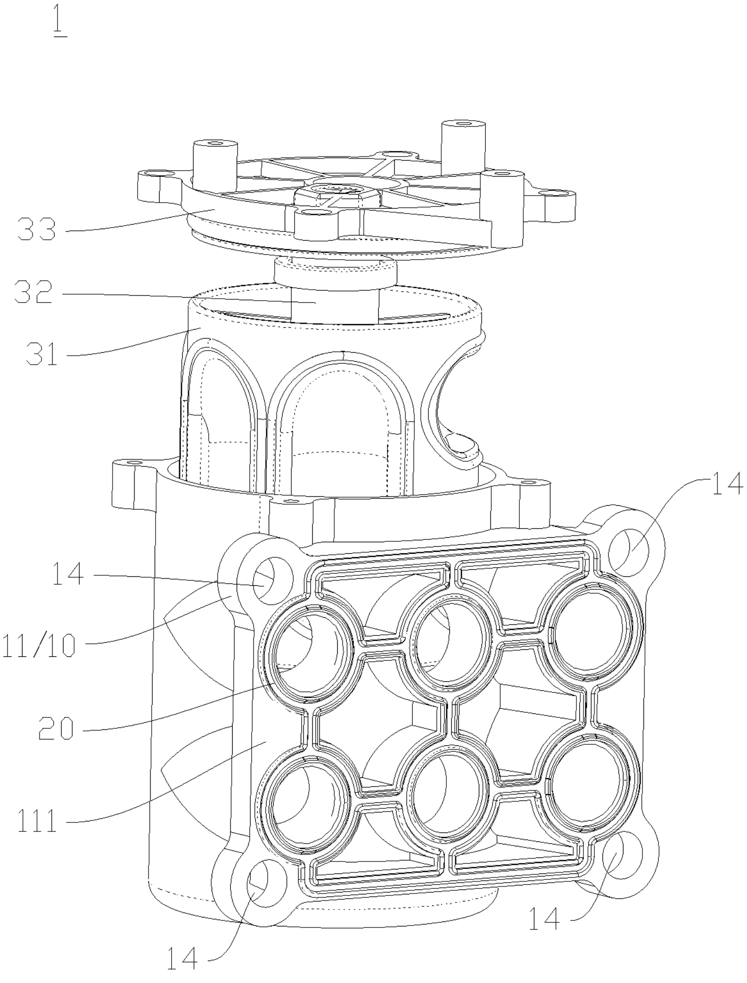
FIG. 2 is a schematic view of an exploded structure of another fluid control assembly provided according to one embodiment of the present disclosure.
Figure 3:
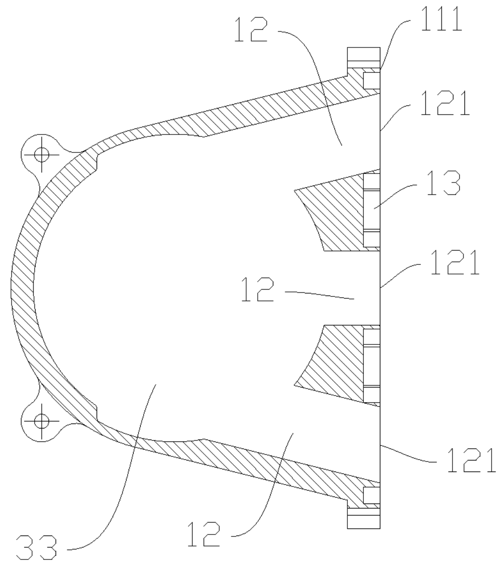
FIG. 3 is a sectional structural schematic view of the housing in FIG. 2.

As shown in FIG. 1 to FIG. 3, in order to realize the sealing between the body 1 and the connecting portion 2, an embodiment of the present disclosure also provides a body 1, which includes a housing 10 and a sealing member 20. The housing 10 includes a first mounting main body 11 with a mounting surface 111. The housing 10 has at least two passages 12 and an accommodating groove 13 which surrounds the passages 12. One end of the passage 12 is a port 121 of the housing 10, and the fluid can flow into or out of the body 1 through the port 121. The port 121 of the housing 10 is located in the mounting surface 111, and all the ports 121 of the body 1 are arranged on the mounting surface 111, which can relatively simplify the mounting process between the body 1 and the connecting portion 2, reduce the leakage points at the connecting portion, and increase the sealing reliability.

As shown in FIG. 2, the first mounting main body 11 has at least two first mounting holes 14 penetrating through itself in the thickness direction, and the at least two first mounting holes 14 are all located at the edge of the first mounting main body 11. In this embodiment, the first mounting main body 11 has four first mounting holes 14, the four first mounting holes 14 are located at four corners of the first mounting main body 11, respectively. The first mounting holes 14 may not be provided in other areas (such as a middle area) of the first mounting main body 11.

As shown in FIG. 1, the connecting portion 2 corresponds to the first mounting main body 11, and the connecting portion 2 has at least two communicating holes 201 and a mating surface 202. The communicating holes 201 can correspond to the passages 12 one by one and be in communication with the passages mutually. The mating surface 202 of the connecting portion 2 can be provided opposite to the mounting surface 111 of the first mounting main body 11, and the first mounting main body 11 is fixedly connected to the connecting portion 2. The sealing member 20 is sandwiched between the first mounting main body 11 and the connecting portion 2. In that case, the first mounting main body 11 and the connecting portion 2 compress the sealing member 20, so that the ports located in the body 1 and the communicating holes 201 can be arranged in a sealed manner, thereby facilitating of reducing fluid leakage.

In some embodiments, the body 1 in the embodiment of the present disclosure may be a control valve, and the connecting portion 2 may be a flow passage plate connected to the control valve. Alternatively, the body 1 may be a flow passage plate, and the connecting portion 2 may be a control valve connected to the flow passage plate. It should be noted that the body 1 in the embodiment of the present disclosure is not limited to the control valve and the flow passage plate, but also can be other device applied to the fluid control system, such as a pump and a heat exchanger. The body 1 can also be an integrated part of various functional assemblies, for example an integrated part of a heat exchanger and a valve, an integrated part of a valve and a pump, and an integrated part of a pump and a heat exchanger. The connecting portion 2 can be in other structures connected to the body 1 and provided in a sealed manner for fluid flow. The first mounting main body 11 of the main body 1 can be made of an organic polymer material, for example a plastic material, or be made of a metal material. In this disclosure, the main body 1 is described as a control valve.

In specific implementation, the number of passages 12 included in the first mounting main body 11 can be set according to the demand of a user. For example, the number of passages 12 included in the first mounting main body 11 can be at least two, such as two, three, four, five, six, seven, eight, nine, etc. The number of communicating holes 201 of the sealing member 20 corresponding to each passage 12 is also more than one, for example, two, three, four, five, six, seven, eight, nine, etc. In this embodiment, the number of passages 12 may be the same with the number of communicating holes 201. Alternatively, in other embodiments, the number of passages 12 may also be different from the number of communicating holes 201.

As shown in FIG. 2, when the main body 1 is a control valve, the control valve further includes a valve core 31, a valve spindle 32, an upper cover 33 and a driving device (not shown). The housing 10 has an accommodating chamber, and at least a part of the valve core 31 is located within the accommodating chamber. The driving device includes a driving member, the driving member can be a motor or a combination of a motor and a transmission assembly such as a gear. The driving member drives the valve spindle 32 to rotate, and then drives the valve core 31 to rotate, so that the communication chamber of the valve core 31 is in communication with the corresponding passage 12, thereby realizing the control function of the control valve on the fluid.

As shown in FIG. 2 to FIG. 5, the accommodating groove 13 of the housing 10 extends from the mounting surface 111 toward the interior of the first mounting main body 11. At least a part of the sealing member 20 is located within the accommodating groove 13 and fixedly connected to the housing 10 as an integral structure. With the above configuration, it is possible to avoid the risk that the sealing member 20 is missed or the sealing member 20 falls off during the transportation and transshipment of the fluid control assembly 1000. Compared with assembling the sealing member 20 separately from the housing 10, it is possible to reduce the number of parts, simplify the assembly procedure of the fluid control assembly, avoid the sealing failure caused by the falling off or dislocation of the sealing member 20, and improve the situation that the compression amount of the sealing member 20 is significantly different or inconsistent within the whole sealing area. In this disclosure, the integral structure of two components means that two components are fixed as a whole structure, and the whole structure is an integrated and non-detachable structure.

Figure 4:
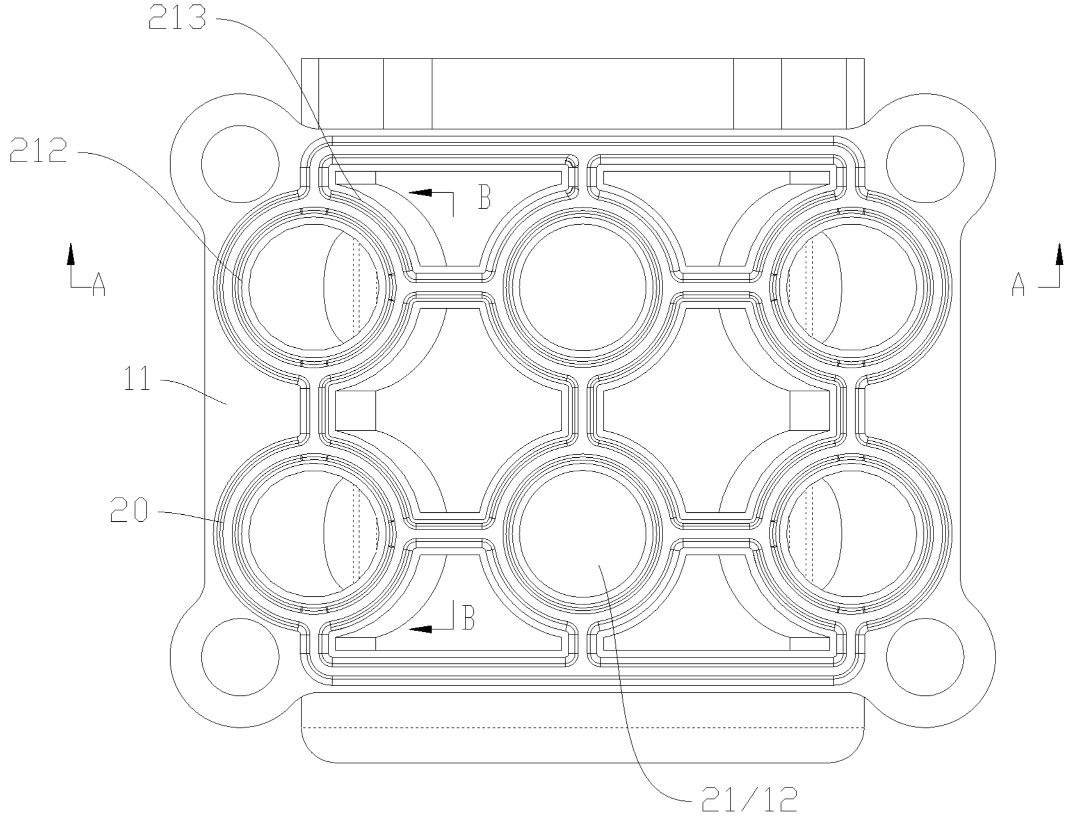
FIG. 4 is a front structural schematic view of the fluid control assembly in FIG. 2.
Figures 5, 6:
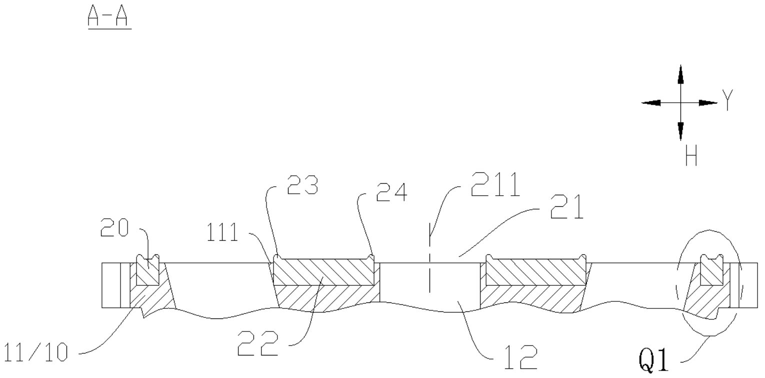
FIG. 5 is a sectional schematic view taken along A-A direction in FIG. 4.
FIG. 6 is an enlarged schematic view of the structure at Q1 in FIG. 5.

H is set as the vertical direction or longitudinal, Y is set as the transverse direction or horizontal, and the vertical direction intersects with the transverse direction. Optionally, the vertical direction is in a perpendicular relationship or a generally perpendicular relationship with the transverse direction. As shown in FIG. 4 to FIG. 6, in some embodiments, the sealing member 20 has at least three first through holes 21, and the number of the first through holes 21 is the same with that of the passages 12 of the housing 10, and the first through holes 21 are correspondingly in communication with the passages 12. The sealing member 20 includes a main body 22 and a first outer extension part 23 which are connected to each other. Along the height direction of the main body 22, i.e., along the vertical direction H shown in FIG. 6, the first outer extension part 23 protrudes from the main body 22, and the first outer extension part 23 forms a closed-loop protruding structure around the first through hole 21 at one end in the height direction of the first through hole 21. At least a part of the main body 22 is filled within the accommodating groove 13. At least a part of the first outer extension part 23 is located on the outer side of the accommodating groove 13 and protrudes from the mounting surface 111. With the above configuration, it is possible to compress the first outer extension part 23 in case that the first mounting main body 11 is connected to the connecting portion 2, so that the sealing member 20 is compressed and deformed, and the sealing function is realized.

In some embodiments, as shown in the cross-sectional views of the sealing member 20 shown in FIG. 5 and FIG. 6, the first outer extension part 23 of the sealing member 20 extends from the main body 22 toward the center line 211 of the first through hole 21. In that case, at least a part of the first outer extension part 23 is arranged obliquely relative to the main body 22. The sealing member 20 may further include a second outer extension part 24 spaced from the first outer extension part 23. The first outer extension part 23 and the second outer extension part 24 are located on both sides of the main body 22 in the transverse direction Y respectively. The distance between the first outer extension part 23 and the second outer extension part 24 is greater than or equal to the width of the main body 22 in the transverse direction. A first groove 25 is provided between the first outer extension part 23 and the second outer extension part 24, and the first groove 25 is recessed toward the main body 22.

In this embodiment, the section of the main body 22 parallel to the vertical direction His substantial rectangular. The first outer extension part 23 and the second outer extension part 24 extend outward corresponding to two corners of the main body 22 close to the groove opening of the accommodating groove 13.

As shown in FIG. 1, FIG. 4 to FIG. 6, in some embodiments, the sealing member 20 further has a first inner wall 212 and a first outer wall 213 corresponding to the first through hole 21. The first inner wall 212 encloses the first through hole 21, and the first outer wall 213 is located at the outer peripheral side of the first inner wall 212. The first outer extension part 23 has a first inner side surface 231, a first outer side surface 232 and a first joint surface 233 connected between the first inner side surface 231 and the first outer side surface 232. The first inner side surface 231 and the first outer side surface 232 are located on both sides of the first outer extension part 23 in the transverse direction Y, respectively. The first joint surface 233 is located at one end of the first inner side surface 231 far away from the main body 22. The first inner side surface 231 of the first outer extension part 23 is a portion of the first inner wall 212, that is, the first inner side surface 231 of the first outer extension part 23 is formed as a portion of the first through hole 21. The first joint surface 233 is a curved surface, and a thickness of a distal end of the first outer extension part 23 far away from the main body 22 is less than a thickness of a proximal end of the first outer extension part 23 close to the main body 22. The second outer extension part 24 and the first outer extension part 23 are symmetrically arranged about a symmetry axis extending in the vertical direction. The longitudinal section of the first groove 25 is in shape of reverse trapezoid shape or a reverse triangular shape. The distance between the first outer extension part 23 and the second outer extension part 24 is greater than or equal to the width W of the main body 22. The distance that the first outer extension part 23 protrudes from a groove bottom wall of the accommodating groove 13 is greater than the height h of the main body 22. As shown in FIG. 6, the first outer side surface 232 is obliquely arranged relative to the outer surface of the main body 22, and the first inner side surface 231 is arranged in parallel with the outer surface of the main body 22, so that the distance between the first outer extension part 23 and the second outer extension part 24 is equal to the width W of the main body 22. Optionally, both the first inner side surface 231 and the first outer side surface 232 may be obliquely arranged relative to the outer surface of the main body 22, so that the cross section of the sealing member is Y-shaped, and in that case, the distance between the first outer extension part 23 and the second outer extension part 24 is greater than the width W of the main body 22. It should be noted that in this disclosure, the portion, relatively close to the main body 22, of each outer extension part is the proximal end while the portion, relatively far from the main body 22, of each outer extension part is the distal end.

In the embodiment of the present disclosure, the first joint surface 233 of the first outer extension part 23 is a curved surface, that is, the distal end of the first outer extension part 23 far away from the main body 22 is curved and the first outer extension part 23 extends toward the direction of the center line of the first through hole, so that the contact area between the first outer extension part 23 and the connecting portion 2 is smaller when the first outer extension part 23 is just subjected to pressure from the connecting portion 2, and the distal end of the first outer extension part 23 is more easier to slide toward the direction close to the center line of the first through hole in the transverse direction Y, thereby reducing the risk that at least a portion of the first outer extension part 23 bends toward the first outer wall 213 after installation, thus reducing the risk of sealing failure.

Figure 8:
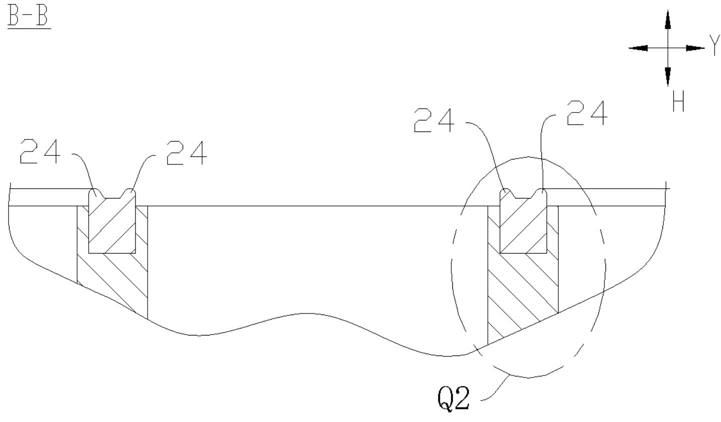
FIG. 8 is a sectional schematic view taken along B-B direction in FIG. 4.
Figure 9:
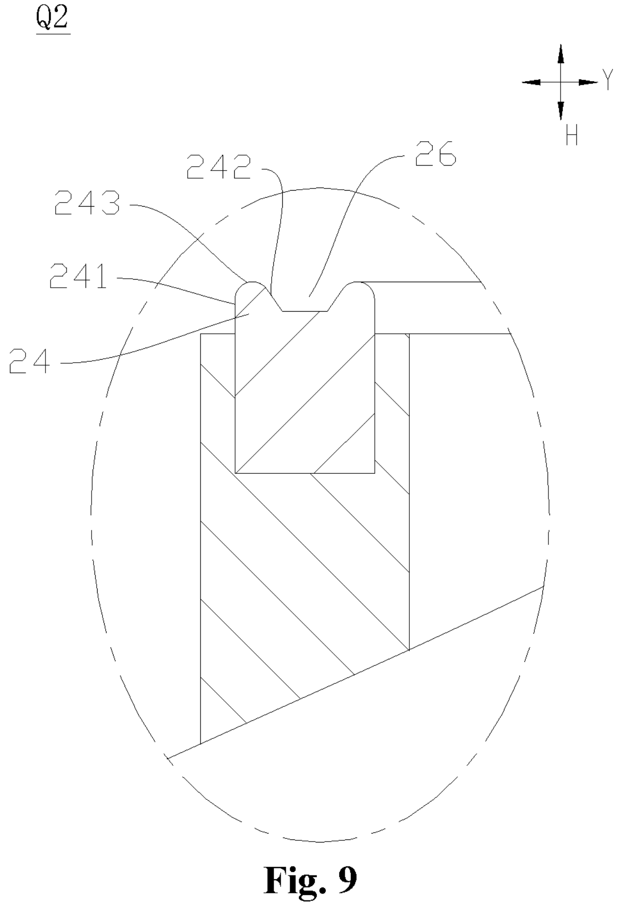
FIG. 9 is an enlarged schematic view of the structure at an area Q2 in FIG. 8.

As shown in FIG. 6, FIG. 8 and FIG. 9, the second outer extension part 24 is similar in structure to the first outer extension part 23. Specifically, the second outer extension part 24 has a second inner side surface 241, a second outer side surface 242, and a second joint surface 243 connected between the second inner side surface 241 and the second outer side surface 242. The second inner side surface 241 and the second outer side surface 242 are located on both sides of the second outer extension part 24 in the transverse direction respectively. The second joint surface 243 is located at one end of the second inner side surface 241 far away from the main body 22, and the second joint surface 243 is a curved surface. In that case, a distal end of the second outer extension part 24 far away from the main body 22 is curved, so that the contact area between the second outer extension part 24 and the connecting portion 2 is smaller when it is just subjected to pressure from the connecting portion 2, and the distal end of the second outer extension part 24 is more easier to slide in the transverse direction, thus reducing the risk of sealing failure of the sealing member 20. Optionally, a second groove 26 is formed between two second outer extension parts 24 located on both sides of the sealing member 20 in the transverse direction, and the cross section of the second groove 26 can be in reverse trapezoid shape or reverse triangular shape.

As shown in FIG. 5 to FIG. 9, in some embodiments, the cross section of the first outer extension part 23 and the cross section of the second outer extension part 24 are generally strip-shaped, and one end of the first outer extension part 23 and one end of the second outer extension part 24 are both connected to the main body 22. It should be noted that "strip-shaped" means that the length of its cross-section is greater than the average thickness of the cross-section, rather than referring to the narrow and elongated shape with parallel sides. Conical, elliptical or other shapes that satisfy the definition can be included. By providing the strip-shaped outer extension part, the outer extension part is easier to bend, so that the sealing member 20 can also perform a better sealing function even when it is subjected to a small pressure.

In some embodiments, the housing 10 is injection-molded from of a plastic material, and the sealing member 20 is made of a vulcanizable material and fixedly connected to the housing 10 into an integral structure through a vulcanization process. Alternatively, the housing 10 is made of a plastic material, and the sealing member 20 is made of a thermoplastic elastomer. The housing 10 and the sealing member 20 are injection-molded by means of a dual-color injection molding process, and the sealing member 20 is fixedly connected to the housing 10 into an integral structure. With the above configuration, the sealing member 20 can be stably connected to the housing 10, and a sealing surface can be formed between the housing 10 and the sealing member 20, thus realizing the sealing between the sealing member 20 and the housing.

Figure 7:
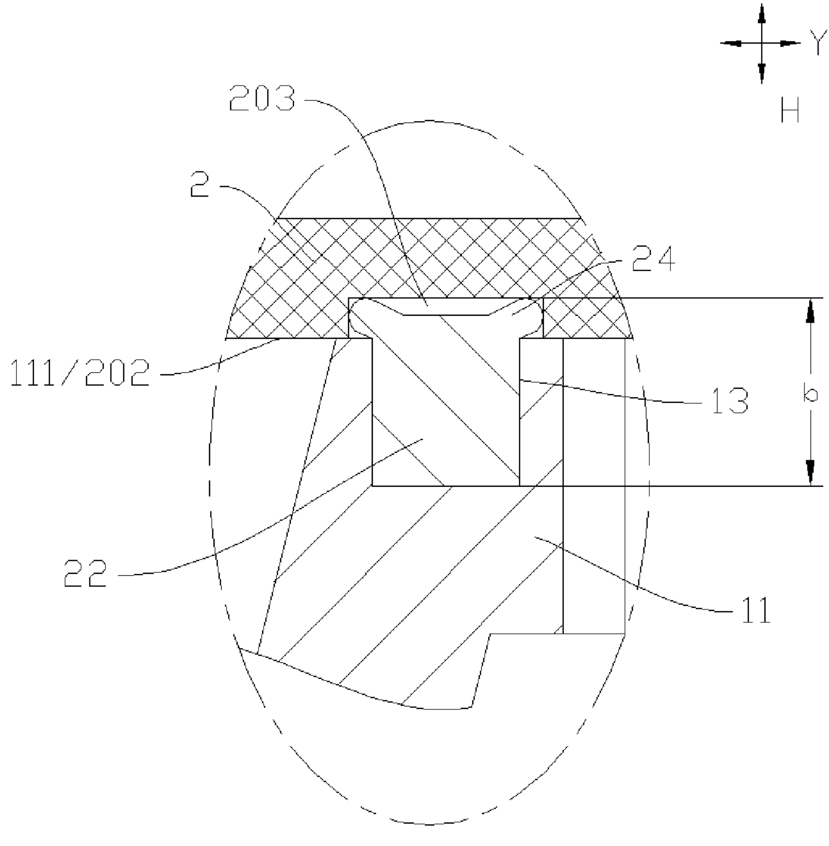
FIG. 7 is an enlarged sectional structural schematic view of a local structure after the first mounting main body, the connecting portion and the sealing member are combined.

As shown in FIG. 6 and FIG. 7, in some embodiments, when the sealing member 20 is in an uncompressed state in the vertical direction, the height of the first outer extension part 23 in the vertical direction is defined as m, and the overall height of the sealing member 20 in the vertical direction is defined as a. When the sealing member 20 is in a state after the first mounting main body 11 is fixed to the connecting portion 2, the first mounting main body 11 of the body 1 and the connecting portion 2 compress the sealing member 20. In that case, the overall height of the sealing member 20 in the vertical direction is defined as b, where $\geqslant > a-b$. With the above provision, the main deformation of the sealing member 20 is distributed in each outer extension part after the installation of the first mounting main body 11 and the connecting portion 2, while the deformation degree of the main body 22 in the vertical direction is smaller, and each outer extension part is easier to deform compared to the main body 22. Therefore, this configuration can relatively reduce the pre-pressure exerted by the whole sealing member 20 between the first mounting main body 11 and the connecting portion 2 under a given amount of compression. In some embodiments, a compression ratio of the sealing member 20 is defined as $(a-b)/a$, and $0.12 \leq (a-b)/a \leq 0.25$, so that the sealing member 20 can achieve better sealing performance.

In order to make the sealing member 20 have a larger expansion space, as shown in FIG. 7, in some embodiments, the connecting portion 2 includes a limiting groove 203, the limiting groove 203 extends from the mating surface 202 toward the interior of the connecting portion 2. The orthogonal projection of the limiting groove 203 on the mating surface 202 surrounds the orthogonal projection of the communicating hole 201 on the mating surface 202. After the first mounting main body 11 is fixedly connected to the connecting portion 2, the first outer extension part 23 is limited to the limiting groove 203, and the height of the limiting groove 203 is less than the height of the first outer extension part 23 protruding from the mounting surface 111. In the width direction of the sealing member 20, i.e., in the transverse direction Y in FIG. 7, the width of the limiting groove 203 is greater than the overall width of the sealing member 20.

Figure 10:
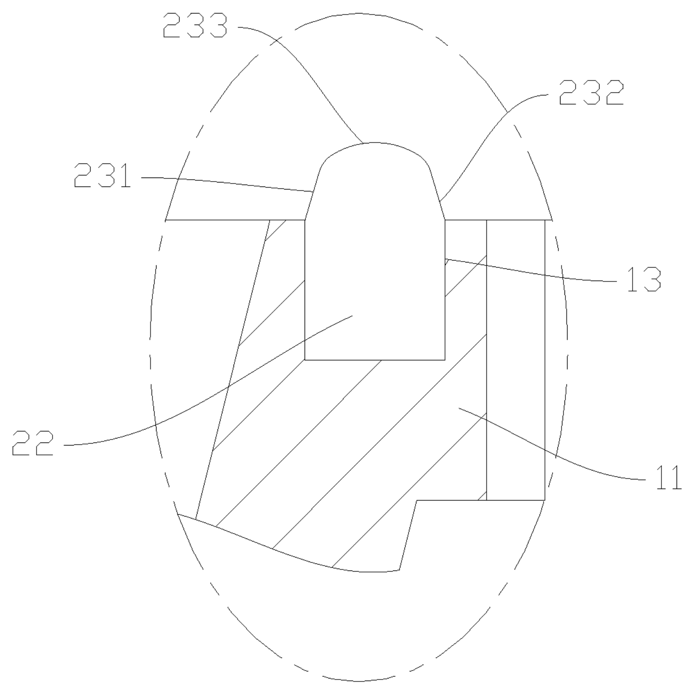
FIG. 10 is a sectional structural schematic view of a local structure of a sealing member and a housing provided according to another embodiment of the present disclosure.
Figure 11:
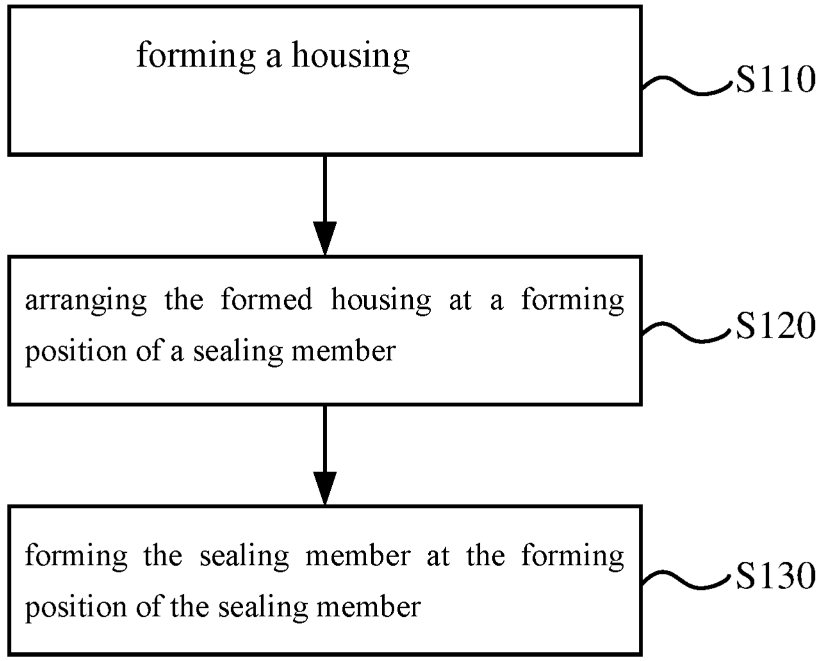
FIG. 11 is a schematic flowchart view of a manufacture method of a fluid control assembly provided according to an embodiment of the present disclosure.

As shown in FIG. 10, a cross-sectional schematic view of the sealing member 20 provided according to another embodiment of the present disclosure is shown. In some embodiments, a cross-sectional shape of the first outer extension part 23 is the same with that of the main body 22 at the joint of the first outer extension part 23 and the main body 22, and the cross-sectional area of the first outer extension part 23 decreases along the direction away from the accommodating groove 13. Accordingly, the housing 10 can be made of a plastic or metal, and the sealing member 20 can be formed by means of an elastic glue liquid being poured into the accommodating groove 13 and being cured. The sealing member 20 and the housing 10 are adhered and fixed into an integral structure. Optionally, the sealing member 20 is formed by a silica gel or ultraviolet curing glue. With the above configuration, it is convenient to form the sealing member 20 in the accommodating groove 13 of the housing 10, so that the sealing member 20 and the housing 10 are stably and fixedly connected into an integral structure, and a sealing surface is formed between the sealing member 20 and the housing 10, thus having good sealing performance.

In summary, according to the fluid control assembly 1000 provided by the embodiment of the present disclosure, the body 1 of the fluid control assembly 1000 includes a housing 10 and a sealing member 20. The housing 10 includes at least two passages 12, and the sealing member 20 includes at least two first through holes 21 corresponding to and in communication with the passages 12, so that fluid can flow through the passages 12 and the first through holes 21. The sealing member 20 includes a main body 22 and a first outer extension part 23 protruding from the main body 22. The first outer extension part 23 forms a closed-loop protruding structure around the first through hole 21 at one end in the height direction of the first through hole 21. At least a part of the first outer extension part 23 protrudes from a mounting surface 111, it is easier for the mounting surface 111 to be contacted and fitted with other components, and other components can compress the first outer extension part 23 to deform the sealing member 20, thereby achieving the sealing between the body 1 with other components. Because the sealing member 20 and the housing 10 are fixedly connected into an integral structure, it is possible to avoid the risk that the sealing member 20 is missed or the sealing member 20 falls off during the transportation and transshipment of the body 1 or of the fluid control assembly 1000. Compared with assembling the sealing member separately from the housing, the body 1 provided according to the embodiment of the present disclosure can reduce the number of parts, simplify the assembly procedure of the fluid control assembly, and avoid the risk of sealing failure caused by the falling off or dislocation of the sealing member 20.

In conjunction with FIG. 1 to FIG. 11, an embodiment of the present disclosure also provides a manufacturing method of a fluid control assembly, the manufacturing method includes following steps.

S110: forming a housing 10.

The formed housing 10 includes a first mounting main body 11 having a mounting surface 111, and the housing 10 has at least two passages 12 and an accommodating groove 13 which surrounds the passages 12. The accommodating groove 13 extends from the mounting surface 111 toward the interior of the first mounting main body 11.

S120: placing the formed housing 10 at a forming position of a sealing member.

S130: forming the sealing member 20 at the forming position of the sealing member.

In this embodiment, during forming the sealing member 20, it includes filling a part of material of the sealing member into the accommodating groove 13 of the housing 10 to form the main body 22, and protruding another part of material of the sealing member from the main body 22 toward the outside of the mounting surface 111 to form a first outer extension part 23. The formed sealing member 20 and the housing 10 are fixedly connected into an integral structure, and the formed sealing member 20 surrounds the passage 12.

In some embodiments, the housing 10 is injection-molded with a plastic material, and the sealing member 20 is made of a vulcanizable material and fixedly connected to the housing 10 into an integral structure through a vulcanization process. In specific implementation, the housing 10 can be injection-molded in the housing forming mould, and then the formed housing 10 can be placed in the sealing member forming mould. Then the sealing member 20 and the housing 10 can be vulcanized into an integral structure through the vulcanization process in the sealing member forming mould. Specifically, the surface of the accommodating groove 13 of the injection-molded housing 10 can be applied with adhesive, and then the sealing member is placed in the accommodating groove 13, and the formed housing 10 together with the sealing member are both placed in a high-temperature and high-pressure environment to vulcanize the sealing element 20, so that the formed sealing member 20 is stably adhered into the accommodating groove 13 of the housing 10 and is hermetically connected to the housing 10. In that case, the sealing member 20 can be made of rubber material, for example, the sealing member 20 can be made of Ethylene Propylene Mouldne Monomer (EPDM) or Nitrile Butamouldne Rubber (NBR). The structure of the sealing member 20 made through the above method can be shown in FIG. 6 to FIG. 9, and will not be described in detail again.

Alternatively, the housing 10 is made of a plastic material, and the sealing member 20 is made of a thermoplastic elastomer, for example, the sealing member 20 can be made of polyurethane. The housing 10 and the sealing member 20 are injection-molded through a dual-color injection molding process, and the sealing member 20 and the housing 10 are fixedly connected into an integral structure. With the above configuration, the housing 10 and the sealing member 20 can be formed on the same injection molding machine, simplifying the manufacture process and achieving a high production accuracy of the housing 10 and the sealing member 20. The structure of the sealing member 20 made by the above method can be shown in FIG. 6 to FIG. 9, and will not be described in detail again.

In some embodiments, the housing 10 is made of a plastic or metal, and the sealing member 20 can be formed in the accommodating groove 13 of the housing 10 by means of a Cured In Place Gasket (CIPG) process. In the specific implementation, the formed housing 10 is placed at a forming platform of the sealing member, and then elastic adhesive liquid is poured into the accommodating groove 13 of the housing and cured to form the sealing member 20, and the sealing member 20 and the housing 10 are adhered and fixed into an integral structure. The sealing member 20 can be formed by a silica gel or ultraviolet curing glue. The structure of the sealing member 20 made through the above method can be shown in FIG. 10 and will not be described in detail again.

According to the manufacture method of the fluid control assembly provided by the embodiment of the present disclosure, the sealing member 20 and the housing 10 can be stably connected into an integral structure, and can avoid the risk that the sealing member 20 is missed or falls off during transportation and transshipment of the fluid control assembly, and meanwhile, the sealing member 20 has good sealing performance.

It should be noted that the above embodiments are merely used to illustrate the present application and not to limit the technical solutions described in the present application. Although the present application has been described herein in detail with reference to the above embodiments in this specification, those of ordinary skill in the art should understand that those skilled in the art may still modify or equivalently replace the present application, and all technical solutions and its improvements that do not apart from the spirit and scope of the present application should be covered by the scope of the claims of the present application.

The invention claimed is:

1. A fluid control assembly, comprising a body, wherein the body comprises a housing, a sealing member and a valve core, wherein the housing has an accommodating chamber, and at least a part of the valve core is located within the accommodating chamber, the housing comprises a first mounting main body with a mounting surface, and the first mounting main body is configured for mounting the body, the housing is provided with at least two passages and an accommodating groove which surrounds the passages, the passages penetrate through the mounting surface, and the accommodating groove extends from the mounting surface toward the interior of the first mounting main body;

wherein the sealing member is provided with a plurality of first through holes, the first through holes correspond to and are in communication with the passages of the housing, the sealing member comprises a main body and a first outer extension part which are connected to one another, the first outer extension part is formed at an edge portion of the main body in a width direction of the main body, the first outer extension part protrudes from the main body in a height direction of the main body, and the first outer extension part forms a closed-loop protruding structure around each of the first through holes at one end of the first through holes;

wherein at least a part of the main body is filled in the accommodating groove, at least a part of the first outer extension part is located on the outer side of the accommodating groove, and at least a part of the first outer extension part protrudes from the mounting surface, and the sealing member and the housing are formed in an integral structure, wherein the sealing member further has a first inner wall corresponding to the first through hole, the first outer extension part has a first inner side surface, a first outer side surface and a first joint surface connected between the first inner side surface and the first outer side surface, the first inner side surface and the first outer side surface are located on both sides of the first outer extension part in the transverse direction respectively, wherein the first joint surface is located at one end of the first inner side surface away from the main body in the height direction of the main body, the first inner side surface of the first outer extension part is a part of an inner wall surface of the first through hole, and the first joint surface is a curved surface, wherein, when the sealing member is in an uncompressed state in the height direction of the main body, the first outer extension part extends from the main body toward a center line of the first through hole in a direction oblique to the height direction of the main body.

2. The fluid control assembly according to claim 1, wherein the sealing member further comprises a second outer extension part, which is configured to be spaced apart from the first outer extension part, and the first outer extension part and the second outer extension part are located on both sides of the main body in a transverse direction, respectively, and a distance between the first outer extension part and the second outer extension part is greater than or equal to a width of the main body in the transverse direction, and a first groove is provided between the first outer extension part and the second outer extension part, the first groove is recessed toward the main body.

3. The fluid control assembly according to claim 2, wherein the housing is injection-molded with a plastic material, and the sealing member is made of a vulcanizable material and is fixedly connected to the housing into an integral structure by a vulcanization process;

or, the housing is made of a plastic material, the sealing member is made of a thermoplastic elastomer, and the housing and the sealing member are injection-molded through a dual-color injection molding process, and the sealing member and the housing are fixedly connected into an integral structure.

4. The fluid control assembly according to claim 2, wherein the fluid control assembly further comprises a connecting portion, the connecting portion has at least two communicating holes and a mating surface, the mating surface of the connecting portion is provided opposite to the mounting surface of the first mounting main body, and the first mounting main body is connected to the connecting portion, and the communicating holes of the connecting portion are in communication with the passages of the first mounting main body, the sealing member is sandwiched between the first mounting main body and the connecting portion.

5. The fluid control assembly according to claim 1, wherein a thickness of a distal end of the first outer extension part far from the main body is less than a thickness of a proximal end of the first outer extension part close to the main body.

6. The fluid control assembly according to claim 5, wherein the housing is injection-molded with a plastic material, and the sealing member is made of a vulcanizable material and is fixedly connected to the housing into an integral structure by a vulcanization process;

or, the housing is made of a plastic material, the sealing member is made of a thermoplastic elastomer, and the housing and the sealing member are injection-molded through a dual-color injection molding process, and the sealing member and the housing are fixedly connected into an integral structure.

7. The fluid control assembly according to claim 1, wherein the second outer extension part and the first outer extension part are symmetrically arranged about a symmetry axis extending in a vertical direction, and a longitudinal section of the first groove is a reverse trapezoid shape or a reverse triangular shape.

8. The fluid control assembly according to claim 1, wherein the housing is injection-molded with a plastic material, and the sealing member is made of a vulcanizable material and is fixedly connected to the housing into an integral structure by a vulcanization process;

or, the housing is made of a plastic material, the sealing member is made of a thermoplastic elastomer, and the housing and the sealing member are injection-molded through a dual-color injection molding process, and the sealing member and the housing are fixedly connected into an integral structure.

9. The fluid control assembly according to claim 1, wherein a cross-sectional shape of the first outer extension part is the same with that of the main body at the joint of the first outer extension part and the main body, wherein a cross-sectional area of the first outer extension part decreases along a direction away from the accommodating groove.

10. The fluid control assembly according to claim 9, wherein the housing is made of a plastic or metal, an elastic adhesive liquid is poured into the accommodating groove and cured to form the sealing member, and the sealing member and the housing are adhered and fixed into an integral structure, and the sealing member is made of a silica gel or ultraviolet curing glue.

11. The fluid control assembly according to claim 9, wherein the fluid control assembly further comprises a connecting portion, the connecting portion has at least two communicating holes and a mating surface, the mating surface of the connecting portion is provided opposite to the mounting surface of the first mounting main body, and the first mounting main body is connected to the connecting portion, and the communicating holes of the connecting portion are in communication with the passages of the first mounting main body, the sealing member is sandwiched between the first mounting main body and the connecting portion.

12. The fluid control assembly according to claim 1, wherein the fluid control assembly further comprises a connecting portion, the connecting portion has at least two communicating holes and a mating surface, the mating surface of the connecting portion is provided opposite to the mounting surface of the first mounting main body, and the first mounting main body is connected to the connecting portion, and the communicating holes of the connecting portion are in communication with the passages of the first mounting main body, the sealing member is sandwiched between the first mounting main body and the connecting portion.

13. The fluid control assembly according to claim 12, wherein when the sealing member is in an uncompressed state in the vertical direction, the height of the first outer extension part in the vertical direction is defined as m, and the overall height of the sealing member in the vertical direction is defined as a, and when the sealing member is in a state after the first mounting main body is fixed to the connecting portion, the overall height of the sealing member in the vertical direction is defined as b, wherein, $m \geq a-b$, $0.12 \leq (a-b)/a \leq 0.25$.

14. The fluid control assembly according to claim 12, wherein the connecting portion comprises a limiting groove, the limiting groove extends from the mating surface toward the connecting portion, the orthogonal projection of the limiting groove on the mating surface surrounds the orthogonal projection of the communicating hole on the mating surface, the first outer extension part is limited to the limiting groove, and the height of the limiting groove is less than the height of the first outer extension part protruding beyond the mounting surface, the width of the limiting groove is greater than the overall width of the sealing member in the width direction of the sealing member.

15. A manufacture method of the fluid control assembly according to claim 1, comprising:

forming a housing, the formed housing comprises a first mounting main body with a mounting surface, the housing is provided with at least two passages and an accommodating groove which surrounds the passages, and the accommodating groove extends from the mounting surface toward the interior of the first mounting main body;

placing the formed housing at a forming position of a sealing member;

forming the sealing member at the forming position of the sealing member, which comprises: filling a part of the sealing member material into the accommodating groove to form at least a part of the main body, and protruding another part of the sealing member material from the main body beyond the mounting surface to form a first outer extension part, and the formed sealing member and the housing are fixedly connected into an integral structure and the formed sealing member surrounds the passages.

16. The manufacture method of the fluid control assembly according to claim 15, wherein the housing is injection-molded with a plastic material, and the sealing member is made of a vulcanizable material and fixedly connected to the housing into an integral structure through a vulcanization process;

the material of the sealing member comprises one of Ethylene Propylene Mouldne Monomer (EPDM) and Nitrile Butamouldne Rubber (NBR) or a combination thereof.

17. The manufacture method of the fluid control assembly according to claim 15, wherein the housing is made of a plastic or metal, an elastic glue liquid is poured into the accommodating groove and cured to form the sealing member, and the sealing member and the housing are adhered and fixed into an integral structure, and the sealing member is formed by a silica gel or ultraviolet curing glue.

18. A manufacture method of the fluid control assembly according to claim 1, comprising:

a housing and a sealing member are injection-molded by means of a dual-color injection molding process, and the sealing member and the housing are fixedly connected into an integral structure, wherein, the formed housing comprises a first mounting main body with a mounting surface, the housing has at least two passages and an accommodating groove which surrounds the passages, the accommodating groove extends from the mounting surface to the interior of the first mounting main body, a portion of the formed sealing member is located in the accommodating groove to form at least a portion of the main body, and a portion of the sealing member protrudes from the main body beyond the mounting surface to form a first outer extension part.

* * * * *